United States Patent [19]

Massicotte

[11] 4,352,732
[45] Oct. 5, 1982

[54] FLOTATION SYSTEM

[75] Inventor: Raymond C. Massicotte, Romulus, Mich.

[73] Assignee: Kelsey-Hayes Co., Romulus, Mich.

[21] Appl. No.: 296,592

[22] Filed: Aug. 26, 1981

Related U.S. Application Data

[63] Continuation of Ser. No. 114,474, Jan. 23, 1980, abandoned.

[51] Int. Cl.³ ................................................ B03B 5/40
[52] U.S. Cl. ..................................... 209/17; 209/172
[58] Field of Search ................... 209/13, 17, 18, 156, 209/157, 162, 172.5, 173; 210/519

[56] References Cited

U.S. PATENT DOCUMENTS

| | | | |
|---|---|---|---|
| 1,866,965 | 7/1932 | Clement | 209/173 |
| 1,988,371 | 1/1975 | Chance | 209/173 X |
| 2,533,655 | 12/1950 | Wilmot | 209/173 |
| 3,335,966 | 8/1967 | Haveman | 209/173 |
| 3,822,015 | 7/1974 | Hsieh | 209/173 |
| 3,929,640 | 12/1975 | Dohnert | 210/519 X |
| 4,012,316 | 3/1977 | Ostlund et al. | 209/173 X |

Primary Examiner—John Adee
Attorney, Agent, or Firm—Ralph J. Skinkiss; Ronald W. Wangerow; William P. Hickey

[57] ABSTRACT

A continuous system for separating acceptable from unacceptable synthetic rubber seals and other parts according to their specific gravity comprising a tank having a flotation chamber and an exit or collection chamber. Fluid of a given specific gravity such that the acceptable parts will float therein enters the flotation chamber in such a manner as to produce a rolling or turbulent flow therein. The rolling flow agitates the parts to liberate entrapped air therefrom permitting the parts true buoyancy to float the acceptable parts or sink the unacceptable parts. The floating parts are then swept over an outlet weir into a collection basket by means of a two dimensional fluid flow over said weir.

6 Claims, 5 Drawing Figures

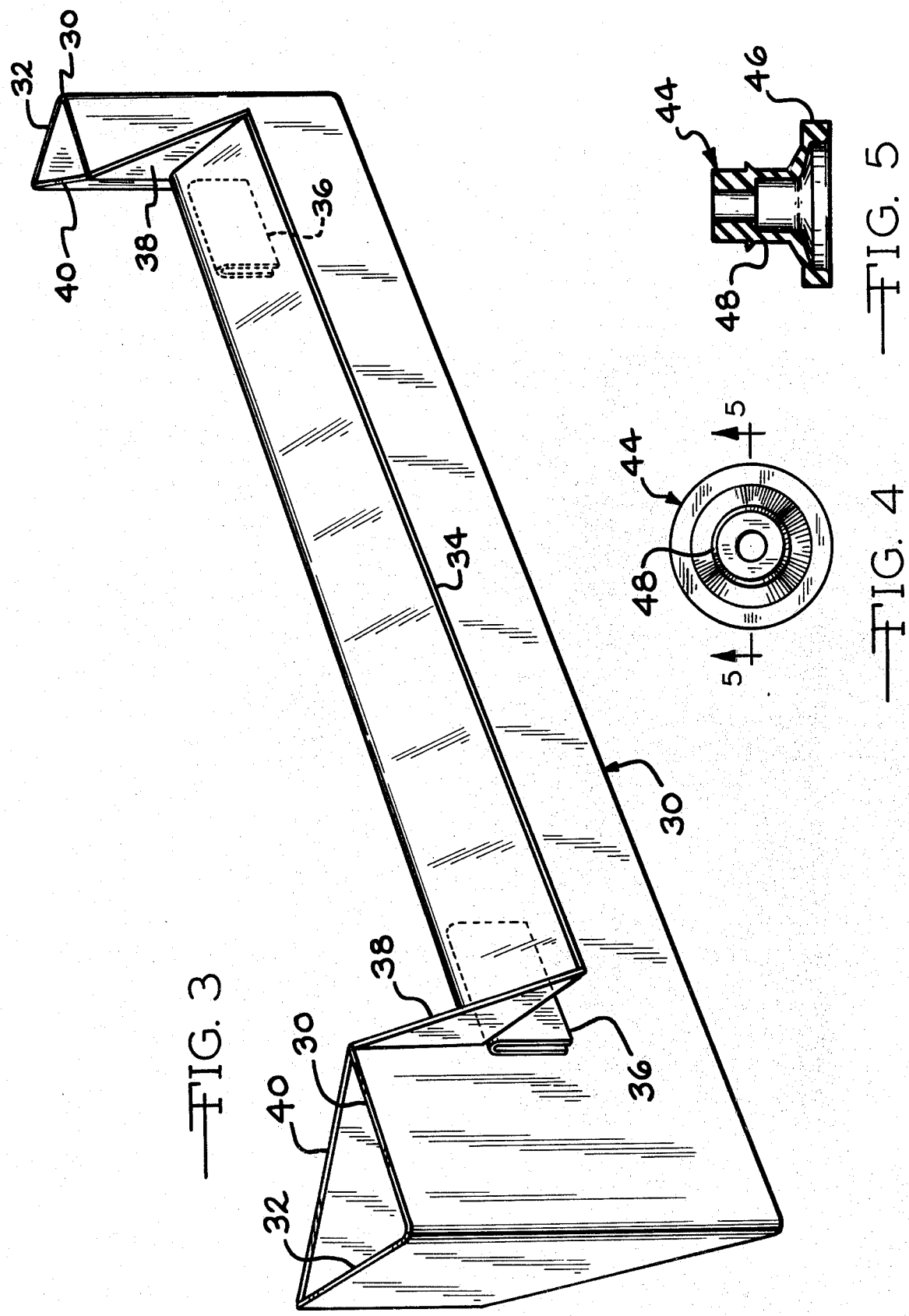

FLOTATION SYSTEM

This is a continuation of application Ser. No. 114,474, filed Jan. 23, 1980, now abandoned.

FIELD OF THE INVENTION

The present invention relates to a system for separating parts according to their specific gravity; and more particularly to a system for separating elastomeric seals of a composition whose specific gravity is compatable with a hydraulic fluid from those whose composition is not.

BACKGROUND OF THE INVENTION

Elastomeric seals, and particularly synthetic rubber seals, are made by compounding fillers and elastomers to produce a material having certain desired properties. It has been known, heretofore, that synthetic rubber seals having a specific gravity above a predetermined value, tend to deteriorate in certain brake fluids. Apparently certain materials in the brake fluid (probably alcohol) cause a deterioration of the heavier compounding materials, either because the heavier materials are not resistant or they detract from the resistance of the lighter compounding materials. The good and bad seals may have specific gravities that differ by as little as 0.02. In the past it was known that seals having a specific gravity above a particular value tended to be softened by brake fluid, but prior to the present invention there has not been, to my knowledge, a continuous process of separation based on this principle.

An object of the present invention is the provision of a process which will continuously separate parts having a difference in specific gravity of as low as 0.02.

Another object of the invention is the provision of a continuous process of the above described type which will adequately separate intricately shaped parts having surface irregularities which tend to form air pockets.

Further objects and advantages of the invention will become apparent to those skilled in the art to which the invention relates from the following description of the preferred embodiments that are described with reference to the accompanying drawings.

SUMMARY OF THE INVENTION

In accordance with the present invention; a continuous travel flotation system for separating acceptable parts from unacceptable parts using the specific gravity of the parts as the criteria for acceptance comprises a tank having an inlet chamber and an outlet chamber at opposite ends of the tank and a flotation chamber between said inlet and outlet chambers, a fluid of a predetermined specific gravity such that acceptable parts will float in said fluid and unacceptable parts will sink in said fluid; means for recirculating said fluid from the outlet chamber to the inlet chamber; and a weir over which the acceptable parts flow leaving the unacceptable parts to sink to the bottom of the flotation chamber.

The recirculation means provides a fluid flow rate through the various chambers of the tank sufficient to produce a flow over the weir of a height equal to the height of a part passing over the weir. The fluid flows from the inlet chamber over an inlet partition in such a manner as to result in a rolling or turbulent flow in the upstream portion of the flotation chamber. The rolling flow dislodges air bubbles from parts being introduced into the tank.

The present invention also includes a removeable tray positioned in the flotation chamber and a strainer basket positioned into the outlet chamber to allow removal of the unacceptable and acceptable parts respectively.

BRIEF DESCRIPTION OF THE DRAWINGS

FIG. 3 is an oblique view of a removeable weir plate used in the tank shown in FIGS. 1 and 2.

FIG. 4 is a plan view of a rubber seal which can be accurately separated according to specific gravity by the system shown in FIGS. 1 through 3.

FIG. 5 is a sectional view taken approximately on the line of 5—5 of FIG. 5.

DETAILED DESCRIPTION OF THE PREFERRED EMBODIMENT

Figure 1:
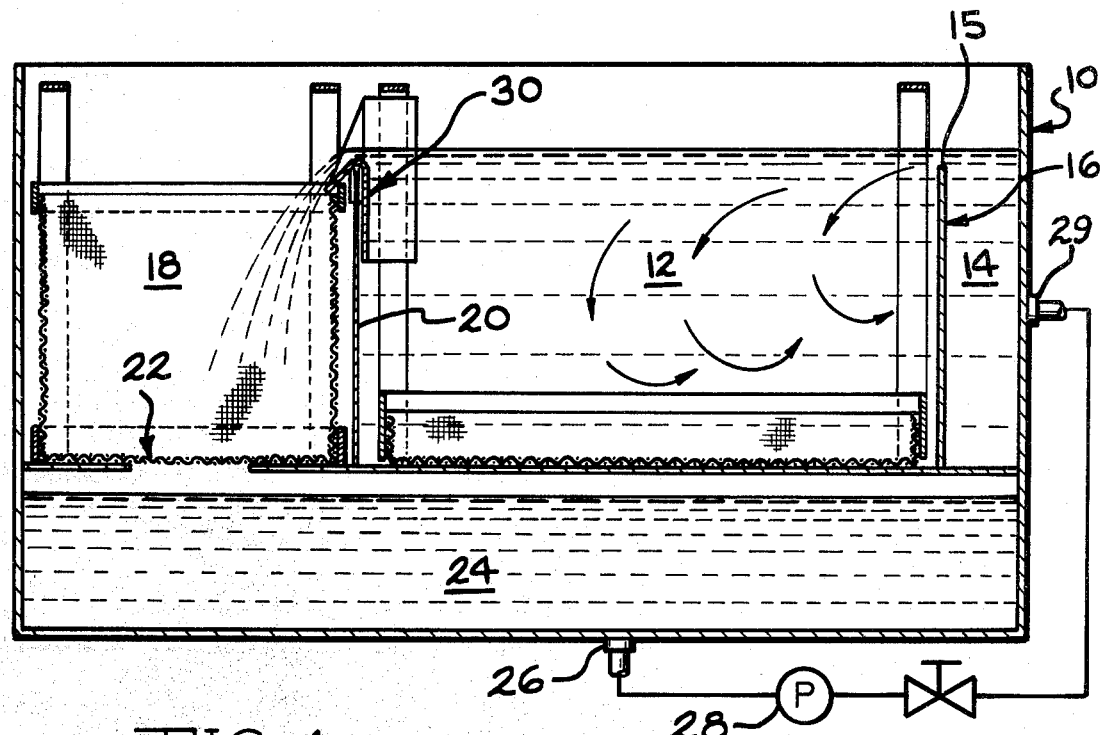
FIG. 1 is a longitudinally extending sectional view through a tank embodying principles of the present invention.
Figure 2:
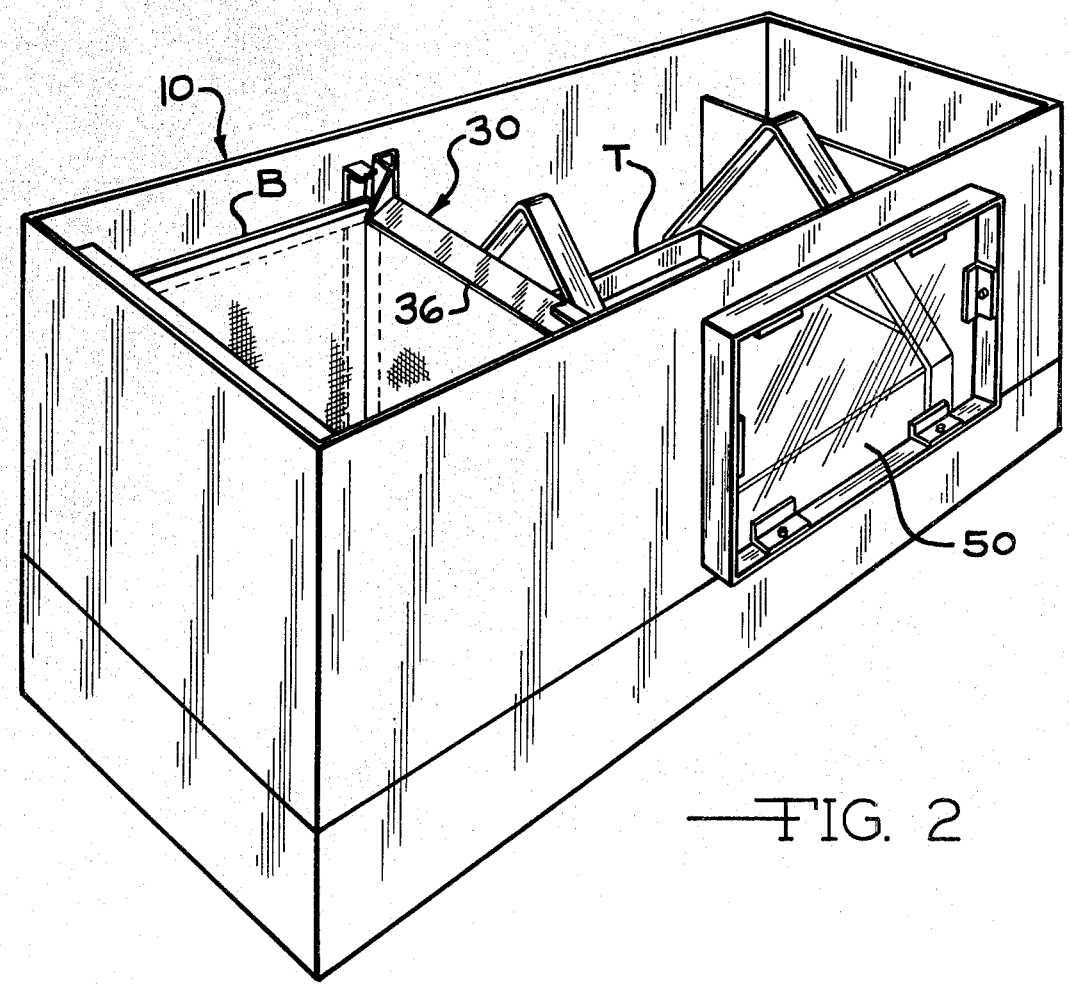
FIG. 2 is an oblique view of the tank shown in FIG. 1.

The apparatus shown in the drawings generally comprises a tank 10 having a flotation chamber 12 separated from an inlet chamber 14 by a partition 16, and separated from an outlet chamber 18 by an outlet partition 20. The apparatus shown is designed to separate parts having a maximum "rolling thickness" of approximately ½ inch. The "rolling thickness" is the height of a part rolling or sliding over the weir. The rolling thickness may be the minimum outside dimension of a part, or if the part is irregularly shaped, it may be the thickness between an indentation capable of resting on the weir and the opposite side of the part as it rolls over the weir. The bottom of the outlet chamber has a drain 22 which empties into a wet sump 24 that extends beneath the three chambers. The wet sump 24 in turn has an outlet 26 that is connected to the suction of a recirculating pump 28, that in turn discharges into a port 29 located in the side of the inlet chamber 14 opposite the inlet partition 16. The port 29 is generally centrally located with respect to the inlet partition 16; so that its force is dissipated against the partition 16 and flows up over the top 15 of the inlet partition 16. Because the inlet chamber 14 is narrow, the forward velocity of fluid issuing from the centrally located port 30 is divided laterally and caused to swirl about generally vertical axes in swirls that spiral to the top of the chamber and spill or flow over the top 15 of inlet partition 16 in a generally turbulent manner. The spilling over of the top 15 of inlet partition 16 causes a rolling type of fluid action within flotation chamber 12 as shown in FIG. 1. The rolling flow is most turbulent immediately down stream of inlet partition 16 and generally dissipates as the outlet partition 20 is approached. The fluid is then caused to spill or flow over the outlet partition in a generally laminar two dimensional flow condition.

In the apparatus shown, the rolling thickness of the maximum size parts to be separated is ½ inch, the tank is 9 inches wide, and the pump 28 delivers a flow over the outlet partition 20 that is ½ inch deep. The bottom of the float chamber is approximately 9 inches below the top of the outlet partition, and the distance between the inlet and outlet partition is approximately 18 inches. In general, depending on the viscosity of the fluid being recirculated, the float chamber may have a depth between 12 and 24 times that of the flow over the outlet partition, and the distance between the inlet and outlet partitions may be from 30 to 42 times the depth of flow over the outlet partition.

The apparatus shown is completed by a removable weir plate 30, a tray T for collecting the rejected parts that settle to the bottom of the float chamber, and a basket B for catching the overflow.

The removable weir plate 30 is formed from a plate approximately two inches wider than the width of the tank. The opposite end one inch wide portions of the plate are bent rearwardly as at 32. The plate 30 is slit downwardly at approximately one inch inwardly from the rearwardly bent portions 32 and the center section between the slits is bent forwardly and downwardly at approximately a 30 degree angle to form a lip 34. One inch wide strips 36 are welded to the bottom of the lip 34 to support the removable weir 30 on the top of the partition 20. Triangularly shaped plates 38 are welded between the side edges of the lip 34 and the edge of the adjacent upstanding portion of the plate 30 to prevent fluid from flowing laterally off of the lip 34. Plates 40 are welded between the rear edge of the rearwardly bent portions 32 and the back of the inner upstanding portions of the plate 30 to divert parts floating along the sides of the tank to the lip 34. The basket B is made of screen or perforated sheet steel with sides that are high enough to extend up behind the lip 34.

The seal 44 shown in FIGS. 4 and 5 has a bottom cup seal portion 46 having a diameter approximately 11/16 inch, and a boss 48 that extends upwardly by a total of ½ inch. Using a fluid having a specific gravity of 1.20, seals 44 having a specific gravity of between 1.04 to 1.19 were separated from seals having a specific gravity of from 1.21 to 1.23. Flow from the pump gave a height of ½ inch over the lip 34.

In operation, separation of acceptable parts from unacceptable parts is accomplished by dropping the parts into the float chamber 12 adjacent the inlet partition 16, so that they became submerged by action of the rolling flow and are moved along by the turbulent flow to the outlet partition 20. A glass window 50 may be provided in the side of the float chamber for observation. The acceptable parts can be seen to roll and come to the top adjacent the outlet weir plate 30 where they float to the surface and roll over the lip 34 into the basket B.

The induced rolling or turbulent flow in the upstream portion of the float chamber 12 affects release of any entrapped air from openings or overhangs in the part and also causes detachment of any small air bubbles which may cling to the part. Such entrapped or clinging air, if not liberated, may affect the overall buoyancy of the part and cause unacceptble parts to float to the surface and spill over the outlet weir 30 along with acceptable parts.

It will now be apparent that there has been provided apparatus for separating parts having a difference in specific gravity as low as 0.02, and that this can be done reliably and continuously.

While the preferred embodiment has been discribed as a system for separating elastomeric parts using a fluid having a specific gravity of 1.20 and a system wherein the desired parts flow into the basket 31 and the rejects settle into the tray T, the invention is not so limited. It will be apparent that in some instances, it may be desired to use a fluid having a different specific gravity for separating parts that are above and below a different specific gravity. In some instances the desired parts may settle into tray T while the light parts which flow into the basket B will be the rejects.

While the invention has been described in considerable detail, I do not wish to be limited to the particular embodiments shown and described; and it is my intention to cover hereby all novel adaptations, modifications, and arrangements thereof which come within the practice of those skilled in the art and which fall within the purview of the following claims.

I claim:

1. In apparatus for separating parts according to their specific gravity, said parts having outside overall dimensions one of which is the minimum outside part dimension that will pass over a weir: a tank having inlet and outlet partitions spaced apart at opposite ends of a float chamber, said inlet and outlet partitions having inlet and outlet weirs respectively for liquid passing into and out of said float chamber, means causing the liquid entering said float chamber to approach said inlet weir as a generally uniform vertically rising stream that rolls over the inlet weir into said float chamber where the rolls proceed downwardly on their side away from the inlet weir and upwardly on their side adjacent said inlet weir, means producing flow over said weirs of a height at least equal to said minimum dimension, and said outlet weir being spaced from said inlet weir by a sufficient distance that said rolling action attenuates in said float chamber adjacent said outlet weir at least for a depth equal to said minimum dimension so that the liquid adjacent said outlet weir does not apply a downward component to floating parts, and whereby parts floating over said exit weir can have a specific gravity that is just slightly less than those sinking in said float chamber.

2. The apparatus of claim 1 wherein the lateral distance between said weirs is from 30 to 42 times said minimum outside part dimension, and the depth of said float chamber is from 12 to 24 times said minimum outside part dimension.

3. In apparatus for separating parts according to their specific gravity, said parts having outside overall dimensions one of which is the minimum outside part dimension that will pass over a weir: a tank having inlet and outlet partitions spaced apart at opposite ends of a float chamber, said inlet and outlet partitions having inlet and outlet weirs respectively for liquid passing into and out of said float chamber, and with the tops of said inlet and outlet weirs being at substantially the same level, an inlet chamber on the opposite side of said inlet partition from said float chamber for supplying liquid to said inlet weir, said inlet chamber having a generally rectangular cross section the major dimension of which extends along said inlet partition, an inlet nozzle to said inlet chamber, said inlet nozzle directing liquid horizontally into said inlet chamber well below and centrally of said inlet weir so that the liquid approaches said inlet weir with a generally uniform vertical velocity to roll over said inlet weir into said float chamber, and said outlet weir being spaced from said inlet weir by a sufficient distance so that liquid approaching said outlet weir will have lost its rolling action to the extent that it has no appreciable vertical component to effect flotation.

4. The apparatus of claim 3 wherein the lateral distance between said weirs is from 30 to 42 times said minimum outside part dimension, and the depth of said float chamber is from 12 to 24 times said minimum outside part dimension.

5. In apparatus for separating parts according to their specific gravity, said parts having outside overall dimensions one of which is the minimum outside part dimension that will pass over a weir: a tank having inlet and outlet partitions spaced apart at opposite ends of a float chamber, said inlet and outlet partitions having inlet and outlet weirs respectively for liquid passing into and out of said float chamber and with the tops of said weirs being at substantially the same level, said weirs being spaced apart by a distance of from 30 to 42 times said minimum outside part dimension and having a depth of from 12 to 24 times said minimum outside part dimension, and means producing a liquid flow over said weirs of at least but not substantially greater than said minimum outside part dimension, and means causing liquid flow over said inlet weir to produce a rolling action in said float chamber.

6. The apparatus of claim 5 wherein said weirs are spaced apart by a distance that is approximately 36 times the minimum outside part dimension and the depth of said float chamber is approximately 18 times said minimum outside part dimension.

* * * * *